US007367497B1

(12) United States Patent
Hill

(10) Patent No.: US 7,367,497 B1
(45) Date of Patent: May 6, 2008

(54) ELECTRONIC ACCESS CONTROL, TRACKING AND PAGING SYSTEM

(76) Inventor: Jason Lester Hill, 35231 Camino Capistrano, Capistrano Beach, CA (US) 92624

( * ) Notice: Subject to any disclaimer, the term of this patent is extended or adjusted under 35 U.S.C. 154(b) by 99 days.

(21) Appl. No.: 11/005,340

(22) Filed: Dec. 6, 2004

Related U.S. Application Data

(60) Provisional application No. 60/527,975, filed on Dec. 9, 2003, provisional application No. 60/528,076, filed on Dec. 9, 2003, provisional application No. 60/528,077, filed on Dec. 9, 2003, provisional application No. 60/528,093, filed on Dec. 9, 2003.

(51) Int. Cl.
*G06K 7/01* (2006.01)

(52) U.S. Cl. .................. 235/382.5; 235/380; 235/382; 235/492

(58) Field of Classification Search ............ 235/382.5, 235/492, 382, 380
See application file for complete search history.

(56) References Cited

U.S. PATENT DOCUMENTS

| | | | | | |
|---|---|---|---|---|---|
| 5,479,408 | A * | 12/1995 | Will | 370/313 |
| 5,971,282 | A * | 10/1999 | Rollender et al. | 235/492 |
| 6,166,496 | A * | 12/2000 | Lys et al. | 315/316 |
| 6,923,370 | B2 * | 8/2005 | Gotfried et al. | 235/382 |
| 7,043,754 | B2 * | 5/2006 | Arnouse | 726/20 |
| 2003/0023874 | A1 * | 1/2003 | Prokupets et al. | 713/201 |
| 2004/0127210 | A1 * | 7/2004 | Shostak | 455/422.1 |

OTHER PUBLICATIONS

Wireless Mesh Networks, Roberts Poor, EmberCorp., Sensors Magazine, Feb. 1, 2003, http://www.sensorsmag.com/articles/0203/38/main.shtml.*
Hill, Jason et al., "System Architecture Directions for Networked Sensors", ASPLOS-IX, Cambridge, Massachusetts, Nov. 2000.
Hill, Jason Lester, "System Architecture for Wireless Sensor Networks", PhD Thesis published at the University of California at Berkeley, 2003, pp. 1-186.
Chakeres, Ian D. et al., "AODV Routing Protocol Implementation Design", Proceedings of the International Workshop on Wireless Ad Hoc Networking (WWAN), Tokyo, Japan, Mar. 2004.
Culler, David et al., "Overview of Sensor Networks", IEEE Computer, Special Issue in Sensor Networks, Aug. 2004, pp. 41-49.

* cited by examiner

*Primary Examiner*—Michael G. Lee
*Assistant Examiner*—Kristy A. Haupt
(74) *Attorney, Agent, or Firm*—Blakely Sokoloff Taylor & Zafman LLP

(57) ABSTRACT

A universal wireless access control and paging system including universal wireless identity devices, fixed RF nodes, location beacons, and other devices which can store access privileges, store and provide personal identification information, record personal activity and presence, and deliver text or audio messages. The key component in the system is the universal identification card which contains wireless communication circuitry, data display circuitry, and a memory circuit for the storage of personal and location information. Further the universal identification card contains a microprocessor coupled to the memory circuitry, the display circuitry and the data communications circuitry. The device also can contain an input means to allow the user to control the card function during operation. This includes the ability to select what personal information can be accessed over the wireless communication means.

3 Claims, 2 Drawing Sheets

Innovative Building Security System

Block Diagram of Universal ID Card

Innovative Building Security System

ELECTRONIC ACCESS CONTROL, TRACKING AND PAGING SYSTEM

CROSS-REFERENCE TO RELATED APPLICATIONS

This application claims the benefit of U.S. Provisional Patent Application No. 60/527,975 filed Dec. 9, 2003, U.S. Provisional Patent Application No. 60/528,076 filed Dec. 9, 2003, U.S. Provisional Patent Application No. 60/528,077 filed Dec. 9, 2003, and U.S. Provisional Patent Application No. 60/528,093 filed Dec. 9, 2003.

BACKGROUND OF THE INVENTION

1. Field of the Invention

The present invention relates generally to automatic building security systems and employee paging systems. More particularly, the invention relates to the methods and apparatus for authorizing individuals to gain physical or electronic access to secure locations or information. The invention is also capable of compiling an electronic record of activity. The invention can report the current location of all users of universal wireless identity cards within the system.

2. Prior Art

In the prior art there exists known identification methods and apparatus that enable people to gain access to secure facilities. One example involves HID access cards that contain a unique ID number. When presented to a reader, a list of authorized numbers is checked to grant access. However, the amount of personal information stored on the card is very limited. For example, none of the prior art devices are capable of storing activity records. Additionally, none of the prior art cards are capable of communicating with each other.

Location recording mechanisms are also known. By way of example, there exist employee timecard packages that record when an employee arrives and leaves work. Their function is very coarse grained and requires the employee to manually log their entry. These systems are not able to maintain a record of the employee location throughout the day.

In view of the above, what is desired is an improved method or apparatus for a personal identification system that not only acts as an ID card substitute, but also has the intelligence to gather access history and to deliver electronics messages to and from users of the system. Additionally, it is desirable to reduce the number of cards a user has to carry, the improved apparatus is preferably capable of storing multiple pieces of identification information some or all of which may be issued by different authorities. To further improve usability, the device is capable of communication over a wireless means to card readers as well as to other universal ID Devices. If two cards are within the range of their RF communication, they can directly exchange information as desired.

DETAILED DESCRIPTION OF THE PREFERRED EMBODIMENTS

Figure 1:
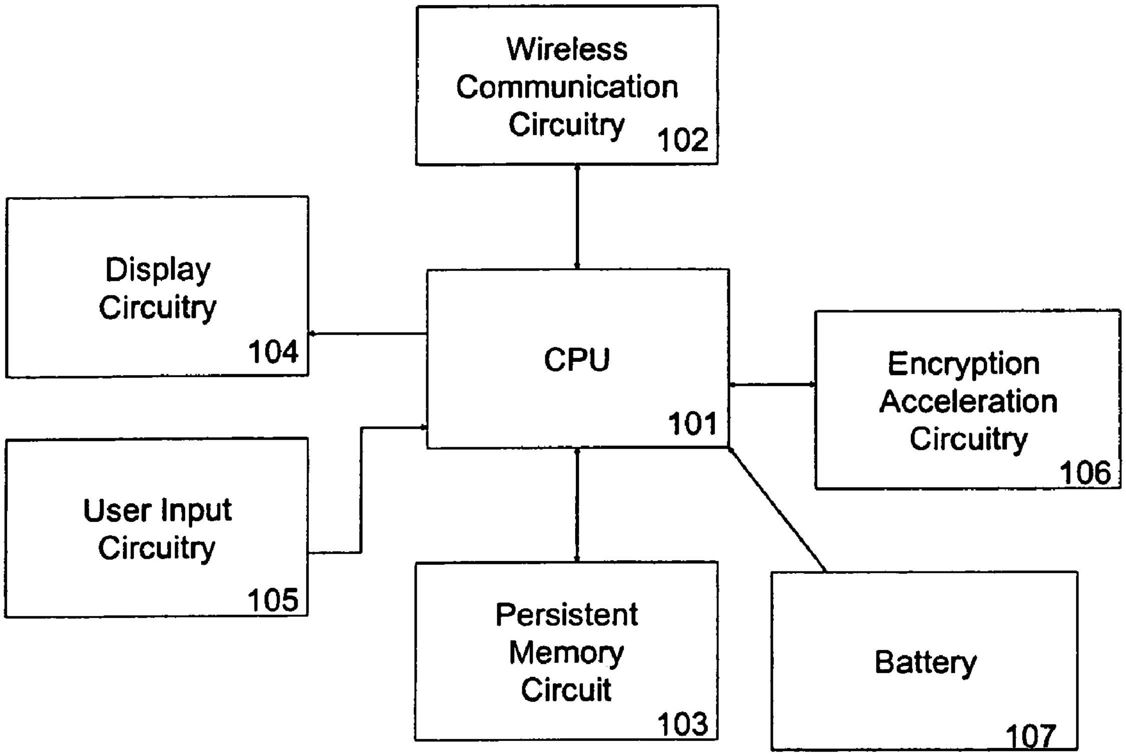
FIG. 1 depicts a block diagram of one embodiment of the universal ID card.

The present invention relates to an electronic access control and paging system which allows the holder of a universal wireless identity badge gain access to secure locations. Additionally it can wirelessly report his presence to an advanced building control system. Finally, the holder is able to send and receive electronic messages. The inventive universal wireless identity badge is capable of holding multiple pieces of identification information for presentation upon request, can contain multiple access rights, and can log location history as the user moves through a secure facility.

The invention relies heavily on the use of peer-to-peer MESH communication technology. This technology allows small low-cost RF devices to communicate directly with each other for long periods of time. Unlike cell-phones that communicate with high-power cellular base stations, peer-to-peer MESH technology has devices that communicate directly with each other over low-power RF communication channels. To achieve a mesh network, individual nodes act as routers for data from other nodes. By relaying data for other notes a web of connectivity is created. Nodes that cannot communicate with each other directly can exchange information by having other nodes relay the data for them. This emerging technology is described in detail in a PhD Thesis published at the University of California at Berkeley in 2003 by Jason Hill entitled "System Architecture for Wireless Sensor Networks", which thesis is hereby incorporated by reference. This thesis provides background on how to construct the hardware and software used in mesh networks, it does not discuss how to apply this technology to build an access control, tracking and paging system.

In one embodiment the electronic identification takes the form of a battery powered ID badge. Other form factors are envisioned. Upon approaching the entrance to a workplace, the user's badge can present company identification information and personal information to a fixed wireless access control node at the front door causing the door to unlock. Simultaneously, the card can record the event in a location log, noting the current time and the location of the door that was opened. As the user makes his way to his personal office, the card will automatically record any electronic landmarks that are passed. These include landmarks placed in hallways, conference rooms, and even in his/her office. At the same time access control nodes, location landmarks and communications nodes in the system can report the movements of the badge holder to other nodes in the system.

As the user exits the work environment the same security device is capable of continuing to grant him access to things such as his car, home and places typically requiring the presentation of ID cards. This can include granting access to sports clubs, night clubs, and even airport terminals. When considering using this novel device in airport terminals, upon arrival at the security screening point, the card transmits a personal identification record consisting of a photograph, name, age, physical description and biometric information. A portable security terminal then verifies the authenticity of the data record and presents the information to a security guard via a display to verify the holder is indeed the person described.

In addition to communicating with the access control devices, the electronic ID cards can communicate with each other. Personal information can be exchanged and verified on a card-to-card basis. By way of example, employees meeting together in a secure environment can confirm that all meeting participants are authorized to participate in the meeting. Each member's ID card provides the owners security clearances to all other members.

Universal wireless ID cards can contain the full information on the user's personal credit cards so that he can be granted credit and charged for purchases at vending machines and cafeterias throughout the system. The ability of the inventive universal identification card to contain multiple forms of identification information represents an advantage over prior art. This ability reduces the number of identification cards that a user must carry. A universal identification card can carry information on multiple credit cards in addition to its other information.

The ability for the inventive identification card to store electronic access privileges represents an advantage over prior art. An electronically signed authorization can be stored on the electronic device. This ability eliminates the need to have all security access points permanently connected to an authorization center. Current systems only place a unique identification number inside each electronic identification card. This number is presented to an electronic reader which must then look the number up in a central database to check for access privileges. Instead, the innovative universal identification cards will store access privileges in persistent memory. The authenticity of the access privileges can be protected by using modern cryptographic techniques. Placing the access privileges on the card itself represents an improvement over existing systems. Having the access privileges stored on the card allows access points to operate autonomously, without requiring that they be continually connected to a central authority. Parking control gates and other remote facilities will not have to be able to communicate back to the central server. Instead, they will behave more like a gate guard that simply checks the authenticity of the ID presented and lets the holder pass. Entry logs can be retrieved later or not at all.

In this building access control system, actuator devices are set to control access to a room by receiving RF communications from a universal identification badge of a person seeking entry to the room. The actuator requests the authentication token or privilege information from the badge and then determines the rights of the badge holder and then grants access by actuating the door latch opener when appropriate. In a more sophisticated application the universal actuator device requests more information from the badge such as biometric data such as an iris scan record. The universal actuator device would then relay the data to an iris scanner which would scan the badge holder to validate that the badge was held by the correct person. The authentication information would be reported to the universal actuator device and the device would open the door if appropriate. This authorized entry is reported over the RF network to other universal actuator devices so that they would know who was currently in the secure area. This information is used to control exit from the secure area by other universal actuator devices. This is an example of how this novel system is capable of having individual devices cooperate in order to provide advanced security capabilities.

The electronic security device described in this system can also send and receive electronic messages. The ability for the inventive universal identification card to send, receive and present electronic messages represents a significant advantage over prior art. This is not a capability present in any existing building access systems. This mechanism can be used to replace employee paging systems as well as to create an entirely new communication paradigm. Instead of delivering corporate bulletins to all employees, messages can be address by location. To do this with this system, a message is addressed to all employees in the parking garage. As employees pass the security access points, their badges would display any new messages. These messages contain important information about facility status or future expected down time. This system would replace unsightly bulletin board systems and noisy PA systems currently used for employee communication. These messages may include the transmission and reception of audio clips, pictures, text or video images.

This novel system also continually records the last known location of a user as he moves past location markers and access points. Previously, identification card systems do not store the location of the card or track the card as it moves through a facility. The inability of prior art cards to provide any real-time location information makes it difficult to locate employees on demand. In environments with a highly mobile work force such as manufacturing or military facilities real time location information can be an important advantage offered by this novel system.

In addition to recording the landmarks passed within the card, the system will also make available the last know location of each user to others upon request. This mechanism can be used to locate personnel on demand. At the end of pay periods the information stored on each card or transmitted to other nodes can be used to facilitate recording the employee work hours and locations worked in.

The ability of this novel building access and paging system to track the location of universal identification cards inside the building allows the system to determine if people have entered a secure area without requesting access. Prior art systems only check access badges when a door must be opened. Several people may walk through the open door. This novel system can detect that multiple universal identification cards have entered a secure area even if they did not individually request access.

The universal identification card has the innovative capability of being able to report the last location landmark that was passed. This information can be presented to users via access terminals. An employee who wants to locate a co-worker can use the security system to find out the last known location. Additionally, the system described has the ability to keep a list of all personnel inside a secured area.

Similarly, an individual node can be queried at any time to report the identities of near-by nodes. This function can be used to re-verify the location information being reported by the system. If an ID badge is believed to be in the storeroom, other badges in that room should report the same thing. This redundancy improves overall system performance. Additionally, the ability to re-verify the known location of an object is a significant advantage over existing systems.

In addition to communicating with the access control devices, the electronic ID cards can communicate with each other. Personal information can be exchanged and verified on a card-to-card basis. By way of example, employees meeting together in a secure environment can confirm that all meeting participants are authorized to participate in the meeting. Each member's ID card provides the owners security clearance to all other members. Additionally, the cards can record the attendee list of the meeting. The meeting organizer is informed if a member does not have the proper authorization. Additionally, electronic hand-outs can be automatically delivered to meeting attendees.

Another advantage of the peer-to-peer system architecture used in this novel system is that groups of people can automatically change their reporting status based on people who are co-located with them. For example, as three members of Project X sit in a meeting, their badges also start reporting the location of the Project X team, not just the individuals.

The wireless universal identification card can also be used to access computers or network connections. The card wirelessly connects to a node attached to a computer or terminal and presents the identification information needed to log on to the computer and subsequently to log on to various networks and servers. Using encryption and auxiliary devices such as iris scanners the system is made extremely secure. The card can retain a history of all such computer and network accesses.

The usage history of this inventive system can be stored in multiple locations. The individual ID cards record a history of their activity, location nodes store a history of the ID badges that have passed by, access control nodes keep a history of nodes that have actuated them and the central servers receive and record reports from both ID badges, location beacons and access control nodes.

In addition to security actuators, this system can also contain auxiliary actuators. Such an actuator device can be used to open a door, turn on lights, close curtains, control a slide show or any other environmental controls or actuators. If a requested action is improper or unauthorized the universal actuator device can issue an alarm. Authorization can be tied into the general building security. Authorizations can be updated over the wireless network to change them in real time as needed.

Security sensors can be used in conjunction with this building access system. If activity is detected in an area of the facility that does not contain any active identification badges, an alarm can be raised. Biometric and other auxiliary security sensors can be used to enhance the security level of the system. These auxiliary sensors can be connected to the access control system through the ad-hoc wireless network.

Door sensors, motion detectors, pressure plates, window sensors, acoustic sensors, trip lines, optical trip sensor and other traditional security system sensors can be tied or connected to this systems as additional sensing points. They can use the wireless networking capabilities of the system to deliver status and alarm messages.

It is expected that large entities will require that their security systems cover a collection of buildings. This is possible with this invention by incorporating WAN (wide area network) access points and LAN (local area network) access points. To connect between separate campuses, security data can be transported over the LAN or WAN as necessary. Additionally, LAN routers can be configured to disable LAN access to any network ports that do not correspond to the location of authorized personnel.

ID Badge

FIG. 1 depicts a block diagram of one embodiment of the universal ID card. All components used to construct the device must be low-power in order to facilitate long battery life. For the wireless communication (radio) circuitry 102, a device such as the Chipcon CC1000 low-power 900 MHz transceiver is appropriate. For the central controller (CPU 101), a microprocessor or microcontroller can be used, such as a Texas Instruments MSP430F149. Flash memory can be used for the persistent memory 103, such as an Atmel AT45 DB041B-SC low-power flash chip. For display 104, use a F51320 Series display from Optex Corp. The user input circuitry 105 may take various forms, ranging from simple switch closures for acknowledgement inputs, yes or no, etc. or may be more sophisticated, depending on the application. The encryption acceleration circuitry may be separate circuitry, of its function carried out by CPU 101 under program control. Battery 107 may be a conventional wet or dry cell battery, rechargeable or not as desired. For detailed information on the construction technique and expected performance from such a node, refer to the previously cited thesis "System Architecture for Wireless Sensor Networks".

One of the important features that has been added to the ID badge is the ability to accept new programming over the radio interface. Using the mesh networking as a transport layer, new software can be loaded into the nodes of the system. This enables one to change node behavior an any time in order to better meet the needs of the system users.

Building Security

Figure 2:
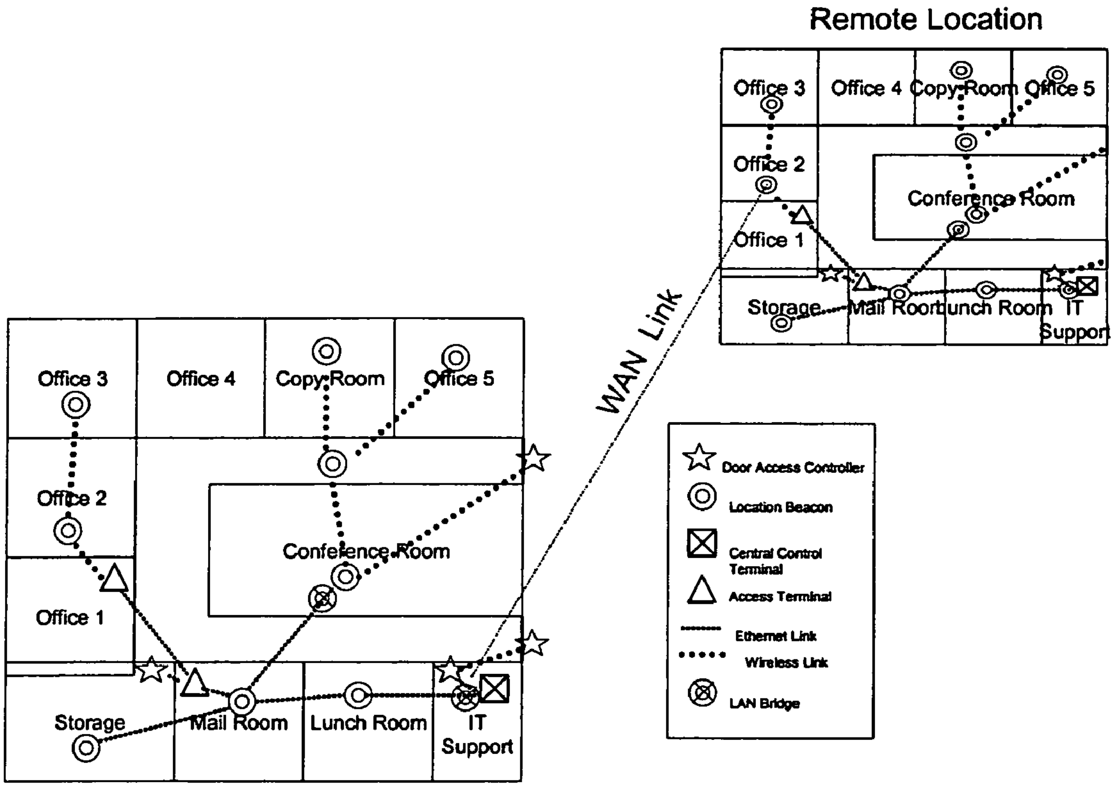
FIG. 2 shows one embodiment of the major components of an employee security, history, tracking and paging system that comprises security access points, universal identification cards, electronic location landmarks, a central terminal and information access points, LAN access points and a WAN link to a remote site.

FIG. 2 shows one embodiment of the major components of an employee security, history, tracking and paging system that comprises security access points, universal identification cards, electronic location landmarks, a central terminal and information access points, LAN access points and a WAN link to a remote site. The universal access card is used to grant the holder the right to pass through the security access points and to record past locations that the card has been interrogated from. Each employee must carry a universal access card. A history of activity is stored in both the cards persistent memory and at a central control terminal.

Power Management

The peer to peer MESH networking used in an embodiment of the system has been designed to conserver power whenever possible. All nodes continually place themselves into low-power modes in order to save power and increase battery life. When communication does occur it is performed as quickly as possible to save power. Additionally, the distributed mesh network relies heavily on precise time synchronization. All message transmission begin within 4 milliseconds of 100 millisecond time slots. This allows node to turn their radio off for a majority of each time slot unless an active transmission is under way. This protocol enhancement allows for a 25× improvement in battery life. Additionally for predictable message transmissions including location beacon transmissions, all location beacons transmit at the same time. This coordination allows each node to schedule when it will listen for a location beacon. In turn, they can leave their radio off when location beacons are not scheduled.

Access Points

The security access points control physical barriers such as automatic door locks that cannot be passed or opened unless a valid authorization is presented. These authorization keys are stored in the universal identification card's persistent memory and are presented upon request. The security access points can be connected over an Ethernet backbone or via a MESH network to a central control terminal which also creates a central log of system usage. These access points are constructed by using the same mesh communication module used in the access card and combining it with electronic door strikes.

Location Beacons

The location beacons are placed throughout the secure facility in key rooms or locations and continually announce their presence. The electronic beacons are programmed with a unique room code as well as a text string that represents the location such as "coffee break room". Electronically, they can be identical to the access badges. They are simply running a different software program and intended to remain at a fixed location. For security purposes location beacons are also equipped with a tamper sensor to prevent unwanted modification. Location beacons also provide time synchronization signals to coordinate multiple nodes. Additionally if possible, a location beacon may be connected to an external power source.

Access Terminals

Access terminals are personal computers equipped with special software designed to interface with the building security systems. They communicate using known networking techniques to the central control terminal in order to monitor and control the system. By using an access terminal, an authorized operator can give additional identification records to ID cards, can review the ID records currently stored on a card and can retrieve information regarding card use and location history. Access terminals can send messages over the mesh network to universal identification devices in the system which changes their access rights or identification information in real time.

Central Terminal

The central terminal is the control center for the entire security system. It can be used to authorize personnel to access secure areas of the building or control what times during the day access is granted. Additionally, it is connected by mesh networking to all security points and location beacons so that it can record the last known location of all identification cards and the history of location, time records for each card. This connection mesh includes the use of LAN gateways, wireless links and even WAN links as necessary. The LAN gateway is a simple device that connects the low-power peer-to-peer MESH network to a LAN. To construct this device, a Lantronix Xport device can be used that can convert between Ethernet and RS-232 serial. Then connect a MESH networking node to the RS-232 interface port and connect the Ethernet interface to the corporate LAN. When used, WAN access is handled transparently by relying on TCP/IP routing to deliver data. Corporate routers can choose to transfer data from the LAN to the WAN as necessary.

In our preferred embodiment, all electronic communication with the universal identification card is performed over a wireless/RF interface. To enhance security, the communication though the aforementioned wireless/RF interface is encrypted using known encryption techniques (RC5). In other embodiments, however, the wireless identification devices may communicate electronically via an optical or magnetic interface.

In our preferred embodiment, the security access points, location beacons, access terminals and central terminals are all connected together using known networking technologies such as TCP/IP over Ethernet. When the holder of a universal ID card approaches an access controlled door, the universal ID card communicates with the security access point via the wireless interface. It first presents a valid form of identification which allows its holder to pass the security checkpoint. Then the universal ID card records the current time and security access point ID that was accessed as a record in its persistent memory circuitry. Additionally, the security access point records the transaction with the central control terminal.

Paging Protocol

The collection of location beacons, access terminals, and security checkpoints is also employed to deliver electronic messages to and from the universal identification cards. In our preferred embodiment, these messages are text messages that are presented to the card holder via an LCD display. First, a text message is typed into any access terminal and delivered to the central terminal. The message is then addressed to a particular access card or to any access card that is seen at a particular location. The message will be delivered to the appropriate universal access cards when they are present at a location beacon or security access point. In future systems, Audio, video, and photographic messages may also be transmitted over this system. In a preferred system, paging messages are transmitted across the network with a header is either PAGE_NODE or PAGE_LOCATION. If a node sees a PAGE_NODE tagged message, it looks at the next 4 bytes of the message to check the destination address. If the destination address is the unique address of the ID card, then the messages is displayed on the LCD screen. If not, the messages is routed on. For the PAGE_LOCATION messages, each node retrieves from persistent memory the last seen location beacon. If the message address matches the last seen location bacon, the PAGE_LOCATION message is displayed on the screen. In both cases the message is routed on. If a location to be paged contains multiple possible location beacons then multiple PAGE_LOCATION messages are sent out over the network. One message is addressed to each location beacon in the paging region.

Page Response

In addition to delivering messages to an access badge, location beacons and security access points can be used to deliver messages from the badge. In a preferred embodiment, these messages are transmissions in response to other text messages. Currently the message to the badge includes the yes/no response option to a text message. If a text messages starts with the string RESPOND, the ID badge will allow the user to reply to the text message with a yes or no answer. These messages are routed over the mesh network back to the central control system. A user of the system can see a log of the user response by connecting to the central control system from any access point.

Identification Information Request Protocol

In one embodiment of the system ID Badges also respond to Information Request Messages. These messages come from Access Points and are designed to communicate identity information. Information request messages contain an INFO_TYPE field that specifies what type of information is needed. Existing types are "SECRET KEY", "CREDIT CARD" and "FINGERPRINT". Many more types of information are envisioned to be stored on the ID Badge. Upon receiving an Information request, ID badge allows the user to select what information to respond with. The user is presented with a list of possible matches to the information request. The user then selects which piece of information to respond with. The information stored on the card is electronically signed so that the requesting node can verify its authenticity. If the user does not want to reveal the information, the user may also choose not to send any information. In the case of a security barrier, not sending the proper "SECRET KEY" results in denial of access.

In the case of our "FINGERPRINT" information, a fingerprint reader requests the digital fingerprint for the badge owner. Then the badge holder can place his finger on the reader and the scanned fingerprint can be compared against the electronic copy. If they match access is granted. This system ensures that the access badge cannot be used by anyone but the intended owner.

Node Memory Layout

In an example embodiment, the memory of each universal identification card may be divided into two segments. One segment is for the storage of the identification information and the second for the storage of usage history and location information. The identification information is stored as records. Each record represents a single type of identification. These variable-sized identification records can represent something as generic as the name, address and phone number of the person or as something as specific as a token granting the person access to a specific secure location at a given time. The records all contain a type field, an expiration field, a text description field and a payload field. The type field can be used to match the request of an access terminal to a particular piece of identification information. By example, a door lock security access terminal requests a type 0x100, "Main Building Access" from a universal id card. The card then searches through its stored identification records for any of type 0x100 and presents them to the access point. The presentation is performed over the wireless communication channel using known encryption techniques. In a system where the universal access card contains input buttons and an output display, the universal identification card presents the textual description of each of the ID's stored on the card that matched the access point's request and allows the user to select which ID's are to be presented to the access point. Additional fields may be added to each ID record if necessary. These fields may, for example, contain information regarding what types of devices are allowed to view ID records.

All ID cards are given a unique network address to handle network routing. This is similar to a Ethernet MAC address.

All ID cards have at least one ID record at all times. This record is the cards primary ID record. It contains the unique device ID number corresponding to the card as well as the name of the owner of the card.

The usage history and location information record section contains a set of fixed sized records. Each record contains a time stamp, a device identification number and a count field. Each time an identification record is read off the card, a history record is created with the current time and the device identification number of the device requesting the ID. If the same device requests an ID multiple times, the count value is incremented each time. The count value for a new request starts off at 1.

Each time a location beacon is heard an update to the history records is made. If it is a newly seen beacon, a record is created with the current time, the device ID of the beacon and a count value of 1. If the same beacon is heard within 3 minutes, the history record is modified so that the count is incremented by the number of minutes since the beacon was last heard and the time is updated to be the current time. This is a highly efficient way of recording that a beacon has been heard continuously for a period of time. Each time a beacon is heard, the ID card also transmits a beacon response back to the beaconing node to signal its reception. This response contains the ID cards primary identification record.

A system using the inventive universal identification card can maintain multiple records of the history of any card—all accesses, movements, times at one location, etc. One record is on the card while others are maintained on any fixed RF node or access point and another history is maintained on a server with access to the RF network.

All access control and paging system nodes start with a unique ID number that is not duplicated on any other node.

Node Tracking Protocol

To perform the tracking operations, location nodes are placed in the environment at fixed, known locations. As a node is placed, it is programmed with a textual description of its location, map coordinates of its location, and its type is set as fixed node. This information is stored in the persistent memory of the device. Once installed, each fixed node periodically transmits an ID message that contains its unique ID number, its location information and that it is a fixed node. These messages are used to distribute information to the ID badges moving through the system also referred to as "mobile nodes."

The mobile devices periodically announce their presence by transmitting an identity message over the wireless interface. The mobile node's identity report contains: a unique ID, a node description, a node type and a sequence number. Additionally the node can be programmed with arbitrary data records that can be requested through a system query. These data records can hold arbitrary binary data. In one embodiment, the records are used to store a home location so that objects can be returned to where they belong.

All nodes in the system listen for ID transmissions originating from other nodes. In our embodiment, ID transmissions occur at very low power levels and can be received from devices at a distance of 20 feet or less away. Reception of an identity message from another device in the system signals that the two devices are in close proximity.

All nodes in the system maintain a table in memory of recently heard nodes. This table records the ID of the node, the communication signal strength, the time of communication, and the type of node that was heard. This is called the neighborhood table.

Entries of Neighborhood Table

| Node ID | Signal Strength | Node Type | Last Time Heard | Node Description |
|---|---|---|---|---|

In one embodiment, when a node wants to calculate its current location, it looks at its neighbor table and searches for the fixed node that has the highest signal strength. The node then assumes that he is co-located with that node. In one embodiment, this table stores the ID information from up to 30 node entries. Once the table is full, the oldest entry is removed to make room for newer entries.

As a node repeatedly determines its location, it stores the result in a location history table. This table simply contains the time a location was determined and the location result. In one embodiment, this table is configured to store only the last 100 entries.

Each time a mobile node determines its location, it sends a location report message announcing its new location. This location report message is routed over the mesh network to a central collection server. All location report messages are eventually received and collected by the central server. This server logs the object location and allows users to request information about the location of objects. The mesh network routing is performed using known multi-hop data collection algorithms. In one embodiment DSDV routing is used.

For more precise locations information, a mobile node can be equipped with a highly directional antenna. This node will only receive identification messages from nodes placed within the directional field of its antenna. This allows the holder of the special node to focus on the precise location of a node.

Asset Tags

In addition to being used as a Universal ID Badge the same piece of hardware can be used as an asset tag. The small, wireless, battery powered node is simply placed on a high-value asset and granted no access privileges. Using the same protocols used to track the ID badges, the high-value asset can be tracked as it moves through the facility. In one implementation a small buzzer is added to the asset tag instead of the LCD display. If the asset tag is paged, it responds by beeping for several seconds. This allows the user to locate the object in a large room.

Location Rules for Mobile Nodes

Additionally, behaviors can be assigned to mobile objects. These behaviors take the form of complex rules. These rules are programmed into the node by providing a conditional statement and a piece of code to execute if the condition is true. This complex rule mechanism can be used to assign a “home location” to a node and have the node report to that location beacon when they were present or alternately report to other location beacons whenever they were “not home”. This rule would check that the “home” node was present in the neighbor table and alter the node behavior accordingly. Additionally, a user of this system establishes rules that persons with certain badges are allowed only in certain areas or rooms and if a violation was detected the violation could be communicated throughout the network.

In addition to using the complex rule feature to modify the behavior of a node based on the current location, the complex rule mechanism can be used to analyze the history that has been accumulated in a tag. Messages can be automatically generated if a person has gone through an inappropriate sequence of locations. For example a rule could be made so that a person cannot leave the facility within 10 minutes of being inside an ultra high security area.

Access Control Protocol

All access control nodes broadcast out an “Access control” identification message. These messages are received by mobile nodes. They contain the ID of the access control node and the type of clearance required to actuate the node. Mobile nodes may choose to respond with a valid clearance message in order to unlock the physical barrier controlled by the access control node. In one embodiment, the access control node is attached to a door lock of type A. If it receives a message from a mobile node containing a valid access clearance for doors of type A, it unlocks the door.

In our preferred embodiment, upon receiving an “Access Control” message, the mobile node waits for user input prior to responding with a request for access. This allows the user to choose which accesses to request.

When an access control node grants access to a secure area, it transmits an “access granted” message to a central server. These messages are collected and used to determine who is inside a facility. The log of accesses granted messages can be compared with location reports in order to determine if multiple people entered a secure facility without individually requesting admittance.

Paging

The electronic paging capability is provided by allowing a user to enter text messages into a central paging server. Once accepted, the messages are transmitted over the multi-hop mesh network to all nodes in the system using a multi-hop flooding protocol. The paging message includes a destination address along with a binary data block that contains the message. If a node receives a paging message with a destination address that exactly matches its unique ID, it presents the message to the node owner. Additionally, it sends a multi-hop “Page received” message back to the central collection server. This message confirms receipt of the page message. If a “Page received” message is not received by the central server, it will retransmit the original page message up to 5 times. If a message is not received after 5 attempts, the sender of the message is informed of the failed attempt and has the option of sending the page to other ID devices co-located with the intended recipient. The Page received messages are delivered using a DSDV routing algorithm. The binary block of the message contains a text paragraph, audio clips or other information. Additionally, it may contain a list of possible replies to the message. If a possible reply is included, the receiver may choose one of the replies. This will cause a “Page Reply” message to be returned to the sender.

Node Power

The Universal wireless ID cards communicate with each other by using peer-to-peer networking techniques and ad-hoc communication protocols. The protocols used are those published as part of the TinyOS research effort at UC Berkeley and are described in their numerous publications. This software suite includes Operating System components that control the underlying messaging primitives used and mesh networking protocols.

Universal wireless ID cards can be powered in several ways. A preferred implementation has a battery which can be replaced when required. In one embodiment, the card has a built in solar cell to charge its battery. Charging power can also be coupled into the card through an inductive coupling that allows electrical power to be transmitted to the card from other devices. Small, low-cost, fuel cells could also be used as a power source.

There has been disclosed herein very versatile and low cost electronic access control, tracking and paging systems capable of incorporating numerous features and operating modes as described herein. It will be apparent however, that the invention may be advantageously employed by incorporating various subsets of its capabilities, either alone or together with other features, and that preferred embodiments disclosed herein are disclosed for purposes of illustration, and not for purposes of limitation. Thus while certain preferred embodiments of the present invention have been disclosed and described herein, it will be understood by those skilled in the art that various changes in form and detail may be made therein without departing from the spirit and scope of the invention.

What is claimed is:

1. A wireless identity device comprising:

a microprocessor or microcontroller; and a radio which can communicate via a MESH network with fixed and mobile nodes such information as location, identity information, access rights, messages, and actuation commands that is powered by a battery and is worn or carried by a user to establish his identity, request access rights, or facilitate tracking of his movements throughout a facility;

the wireless identity device having the capability to communicate with other nodes to determine that all nodes present have proper security clearance.

2. A wireless identity device comprising:

a microprocessor or microcontroller; and a radio which can communicate via a MESH network with fixed and mobile nodes such information as location, identity information, access rights, messages, and actuation commands that is powered by a battery and is worn or carried by a user to establish his identity, request access rights, or facilitate tracking of his movements throughout a facility;

the wireless identity device having input capability which allows the user to issue commands to actuation nodes that are initiated by the user pushing a button or key on the wireless identity device, and the capability to communicate with other nodes to determine that all nodes present have proper security clearance.

3. A wireless identity device comprising:

a microprocessor or microcontroller; and a radio which can communicate via a MESH network with fixed and mobile nodes such information as location, identity information, access rights, messages, and actuation commands that is powered by a battery and is worn or carried by a user to establish his identity, request access rights, or facilitate tracking of his movements throughout a facility;

the wireless identity device having the capability to receive or send a page from/to any other universal wireless identity card or other electronic device within the MESH network where such an ID Device has a display or indicator and means to enter messages, and the capability to communicate with other nodes to determine that all nodes present have proper security clearance.

* * * * *